(12) United States Patent
Johnson

(10) Patent No.: US 6,892,312 B1
(45) Date of Patent: *May 10, 2005

(54) POWER MONITORING AND REDUCTION FOR EMBEDDED IO PROCESSORS

(75) Inventor: Stephen B. Johnson, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 502 days.

This patent is subject to a terminal disclaimer.

(21) Appl. No.: 10/001,518

(22) Filed: Oct. 30, 2001

(51) Int. Cl.[7] .............................................. G06F 11/30
(52) U.S. Cl. ...................... 713/320; 713/322; 713/323
(58) Field of Search ................................ 713/300, 320, 713/322, 601, 323

(56) References Cited

U.S. PATENT DOCUMENTS

| | | | | |
|---|---|---|---|---|
| 5,502,838 A | * | 3/1996 | Kikinis ........................ 713/501 |
| 5,590,061 A | * | 12/1996 | Hollowell et al. ........... 702/130 |
| 5,719,800 A | * | 2/1998 | Mittal et al. ................. 713/321 |
| 5,723,998 A | * | 3/1998 | Saito et al. .................. 327/513 |
| 5,745,375 A | * | 4/1998 | Reinhardt et al. ........... 700/296 |
| 5,752,011 A | * | 5/1998 | Thomas et al. .............. 713/501 |
| 5,825,674 A | * | 10/1998 | Jackson ....................... 713/321 |
| 5,832,284 A | * | 11/1998 | Michail et al. .............. 713/322 |
| 5,870,614 A | * | 2/1999 | Ang ............................. 713/320 |
| 5,881,298 A | * | 3/1999 | Cathey ........................ 713/324 |
| 5,940,786 A | * | 8/1999 | Steeby ......................... 702/132 |
| 6,336,080 B1 | * | 1/2002 | Atkinson ..................... 702/132 |
| 6,415,388 B1 | * | 7/2002 | Browning et al. .......... 713/322 |
| 6,535,798 B1 | * | 3/2003 | Bhatia et al. ................ 700/293 |
| 6,535,984 B1 | * | 3/2003 | Hurd ............................ 713/320 |
| 6,564,328 B1 | * | 5/2003 | Grochowski et al. ....... 713/320 |
| 6,718,474 B1 | * | 4/2004 | Somers et al. .............. 713/322 |
| 6,751,741 B1 | * | 6/2004 | Kawahara et al. .......... 713/320 |

FOREIGN PATENT DOCUMENTS

| | | | | |
|---|---|---|---|---|
| WO | WO 92/10032 | * | 6/1992 | .......... H03K/17/08 |

* cited by examiner

Primary Examiner—Fritz M. Fleming
(74) Attorney, Agent, or Firm—Yee & Associates PC

(57) ABSTRACT

A mechanism is provided for controlling the heat output of a controller by monitoring the temperature of the controller using an embedded heat sensor. The IO processor monitors the temperature and controls the rate of the IO flow to control the temperature. The IO processor accomplishes this by checking the current temperature every time it gets a timer interrupt. If the temperature becomes too high, the IO processor may slow down the processor speeds in the controller. The IO processor may also slow down the throughput by inserting a delay between each IO request processed. Furthermore, the IO processor may slow down the rate at which data is passed onto the bus. Still further, the IO processor may insert a delay between batches of IO requests. By slowing down the IO flow, the IO processor decreases the overall power consumption and, thus, controls the heat output.

25 Claims, 3 Drawing Sheets

POWER MONITORING AND REDUCTION FOR EMBEDDED IO PROCESSORS

RELATED APPLICATIONS

This application is related to commonly assigned and co-pending U.S. patent application Ser. No. 09/969,377 entitled "IO BASED EMBEDDED PROCESSOR CLOCK SPEED CONTROL", filed on 2 Oct. 2001, which is hereby incorporated by reference.

BACKGROUND OF THE INVENTION

1. Technical Field

The present invention is directed generally toward a method and apparatus for monitoring and reducing power consumption and heat output for embedded IO processors.

2. Description of the Related Art

A major concern in server applications is the heat output of a particular server component. Server requirements are constantly changing and demanding faster input/output (IO) controllers to perform IO operations. Some controllers address this need by making a single integrated circuit (IC) that contains multiple embedded processors that run in parallel. All these processors with increasing clock frequencies in a single IC increases the overall power consumption of the IC. The controllers are designed to process more than 100,000 IO requests a second.

Typically, this type of performance is not needed and the server is running at full speed just to process a small amount of IO requests. Even under heavy load, meaning the controller has many IO requests to process at once, the power consumption and heat output of the controller may become too high. These higher temperatures require larger heat syncs and more airflow through the server. This results in rack mount servers that cannot be as tightly packed as one may hope because they must accommodate larger heat syncs or air conditioning systems. Furthermore, energy bills may increase due to the excessive power consumption by controllers, as well as cooling systems. Thus, the user suffers increased costs as well.

Therefore, it would be advantageous to provide improved power monitoring and reduction for embedded IO processors.

SUMMARY OF THE INVENTION

The present invention provides a mechanism for controlling the heat output of a controller by monitoring the temperature of the controller using an embedded heat sensor. The IO processor monitors the temperature and controls the rate of the IO flow to control the temperature. The IO processor accomplishes this by checking the current temperature every time it gets a timer interrupt. If the temperature becomes too high, the IO processor may slow down the processor speeds in the controller. The IO processor may also slow down the throughput by inserting a delay between each IO request processed. Furthermore, the IO processor may insert a delay between batches of IO requests. By slowing down the IO flow, the IO processor decreases the overall power consumption and, thus, controls the heat output.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

The description of the preferred embodiment of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

Figure 1:
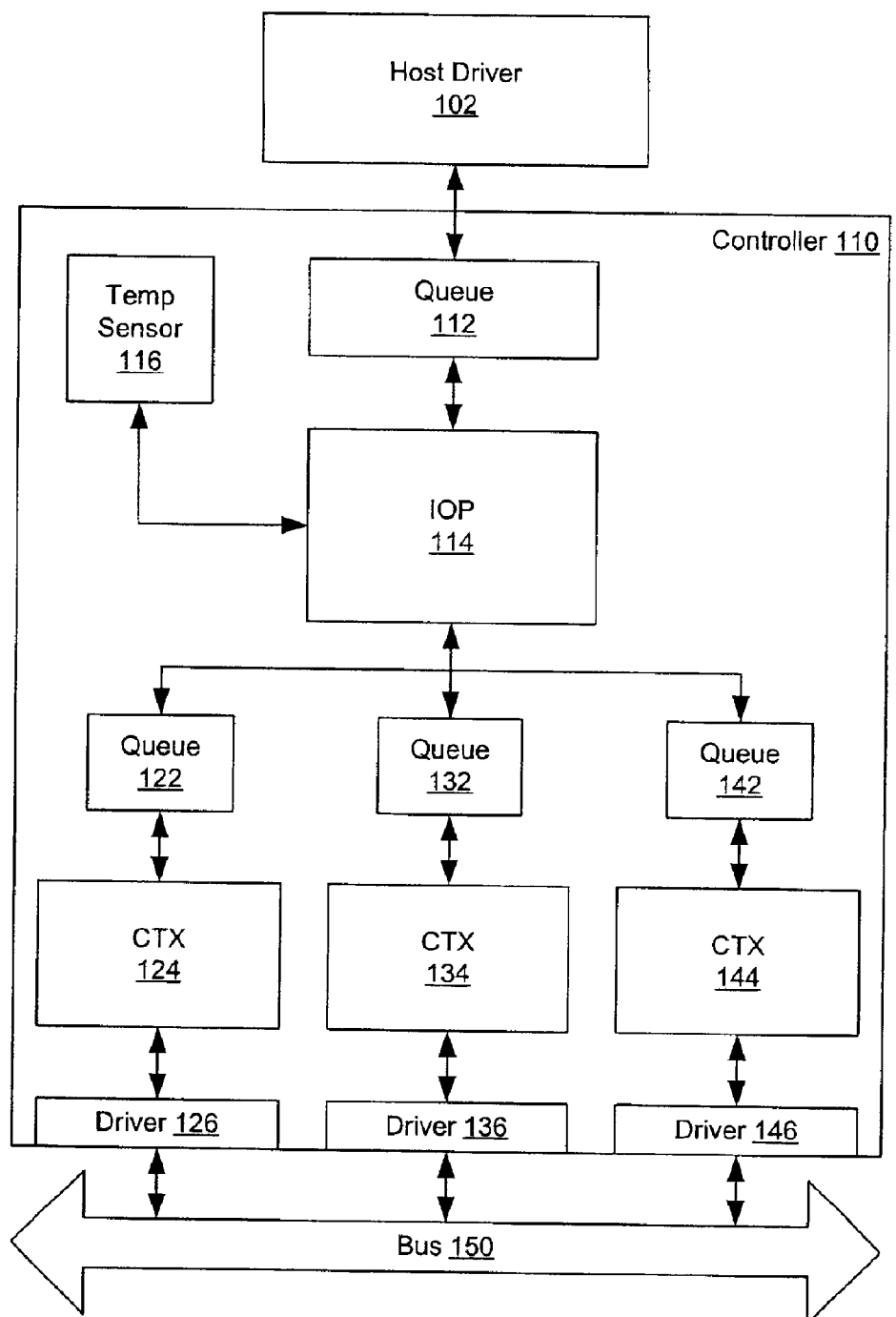
FIG. 1 is a block diagram of a controller with embedded IO processors in accordance with a preferred embodiment of the present invention.

With reference now to the figures and in particular with reference to FIG. 1, a block diagram of a controller with embedded IO processors is shown in accordance with a preferred embodiment of the present invention. Controller 110 receives IO requests from host driver 102 and performs IO operations on bus 150. Host driver 102 may be any driver that requests IO operations on controller 110. In a preferred embodiment, the host driver is a software device driver running in an instance of the operating system of a server. The controller may be any data transfer device, such as a small computer systems interface (SCSI), Infiniband, Fibrechanel, or Serial ATA controller.

Controller 110 uses embedded firmware running on several different embedded processors. One of the processors is IO processor (IOP) 114, which is a control processor that receives IO requests from the host driver and routes the IO to an appropriate lower level processor. The lower level processors include context manager (CTX) processors 124, 134, 144. The appropriate one of CTX processors 124, 134, 144 completes the IO operation. While the example shown in FIG. 1 includes three CTX processors, more or fewer processors may be used depending on the implementation. Host driver 102 may send IO requests to the IOP using a message-based interface (MPT). Those of ordinary skill in the art will appreciate that the hardware depicted in FIG. 1 may vary. For example, more or fewer processors may be used depending on the implementation. The depicted example is not meant to imply architectural limitations with respect to the present invention.

The host driver posts request IO message frames to the IO controller via request queue 112. These IO message frames sit in the first in, first out (FIFO) queue waiting for the IOP to process them. The IOP also routes IO messages to CTX processors 124, 134, 144 via queues 122, 132, 142, respectively. The CTX processors receive IO messages on the queues. CTX processors 124, 134, 144 then process the IO messages and drive data onto bus 150 via drivers 126, 136, 146. The CTX processors drive the data onto the bus using the specifications of the bus. For example, if the controller is a SCSI controller, then the CTX processors drive data onto the bus using the SCSI specifications.

A controller has many embedded components that user power. For example, a significant amount of power is consumed by drivers 126, 136, 146. The power consumed by these drivers is directly proportional to the amount of signals they drive on the bus. The amount of signals they drive is directly proportional to the amount and size of the IO requests they have to process. For example, if the controller receives 30,000 IO requests in a second, the IOP may process all 30,000 IO requests and route them to the CTX processors. Each CTX processor may then process 10,000 IO requests in a second and drive millions of bytes of data onto the bus. In fact, a single IO request may result in millions of bytes of data being driven onto the bus. Therefore, the controller may be consuming a significant amount of power resulting in a sharp increase in temperature.

IOP 114 has a timer that interrupts the IOP periodically. The interrupt time may vary from a few microseconds, for example, to several days. At the interrupt time, the IOP can check the number of outstanding IO requests that the IO controller is currently processing and exactly what processors are busy processing them. Based on this information, the IOP can determine if any of the embedded processors' clock speeds can be reduced to save power. The IOP can also determine if it should reduce its own clock speed. Thus, as the IO controller processes IO requests from the host operating system, it uses this information to increase or decrease clock speeds of its various constituent (preferably embedded) processors effectively based on the IO rate.

In accordance with a preferred embodiment of the present invention, controller 110 includes temperature sensor 116 connected to IOP 114. If the temperature exceeds a predetermined threshold, the IOP slows down the IO flow to reduce power consumption, thus controlling the generation of heat. The IOP may slow down IO flow by reducing the clock frequencies of the processors on the controller. The IO processor accomplishes this by checking the current temperature every time it gets a timer interrupt. If the temperature becomes too high, the IO processor may slow down the processor speeds in the controller. The IO processor may also slow down the throughput by inserting a delay between each IO request processed. Still further, the IO processor may insert a delay between batches of IO requests. By slowing down the IO flow, the IO processor decreases the overall power consumption and, thus, controls the heat output.

Figure 2:
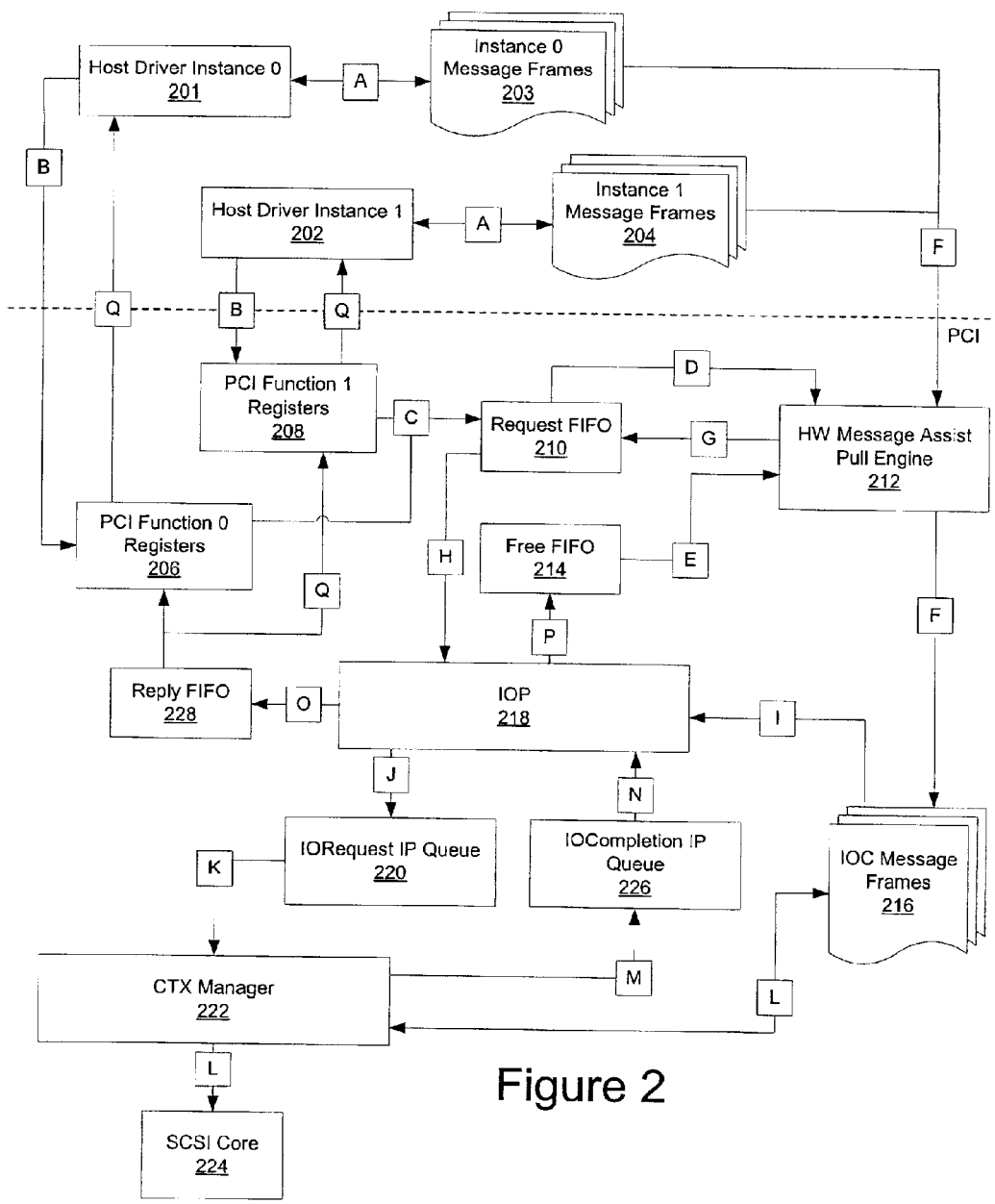
FIG. 2 illustrates message flow from the host driver through the controller and how the controller completes the IO request and replies back to the host in accordance with a preferred embodiment of the present invention.

FIG. 2 illustrates message flow from the host driver through the controller and how the controller completes the IO request and replies back to the host in accordance with a preferred embodiment of the present invention. The host and the IOC may communicate through a Peripheral Component Interconnect (PCI) bus, a circuit board bus connection that connects boards to memory and the CPU. The dashed line demarks the boundary between host and IOC. In a preferred embodiment, the IOC comprises the IOP and other embedded processors, referred to as context managers. The relationships between the depicted block segments are discussed with reference to the boxed letters throughout the drawing.

First, the host operating system creates a Small Computer System Interface (SCSI) IO message in the host address space (step A). Host driver instance 0 201 and host driver instance 1 202 post the System Message Frame Address (SMFA), the addresses of frames which the host OS driver controls, to a PCI Function Request registers 206, 208, part of the hardware embedded on the IO controller chip (step B). The hardware routes the PCI Function Request register to a Request FIFO 210 (step C) which passes the SMFA to a hardware Message Assist Engine 212 (step D). The Message Assist Engine 212 waits for a free Local Message Frame Address (LMFA) from free FIFO 214 (step E) and then passes the System Message Frame to Local Message Frames 216 (step F) via direct memory access (DMA).

Next, the Message Assist Engine 212 writes the LMFA to the Request FIFO 210 (step G). IOP 218 polls the interrupt status register (not shown) for a new request and gets the LMFA (step H). The IOP examines the message header function to determine the message type (step I). Next, the IOP posts the message index descriptor (MD), an index to message frames, on the interprocessor (IP) IO Request Queue 220 (step J). Context manager (CTX Manager) 222, otherwise referred to as a bus protocol manager, polls the interrupt status register for the message index (MID) to find new IO requests (step K). The context manager puts the MID into a context lookup table and copies the message to the SCSI core IO Bucket 224 (step L). The context manager completes the IO by posting the unmodified MID on IO Completion IP Queue 226 (step M). IOP 218 polls the interrupt status register and gets the MID (step N). On success, the IOP posts the unmodified MID to reply FIFO 228 using the function bit in the MID to determine which function to reply to (step O). The IOP then frees the LMFA in free FIFO 214 (step P) and the host gets an interrupt for the reply (step Q).

In a preferred embodiment of the present invention, the IOP may slow down the throughput of the controller, and thus the power consumed by the controller, by limiting the number of requests processed between timer interrupts based on the temperature of the controller. This may be accomplished by inserting a test in step H to determine whether a request limit has been reached. The IOP may then, at each timer interrupt, determine the temperature, compare the temperature to a set of temperature ranges, and set the request limit based on the temperature range within which the temperature falls. Therefore, the IOP may not get the LMFA in step H if the request limit has already been reached. The IOP will then wait until the next timer interrupt for a new request limit to be set to get the LMFA.

Figure 3:
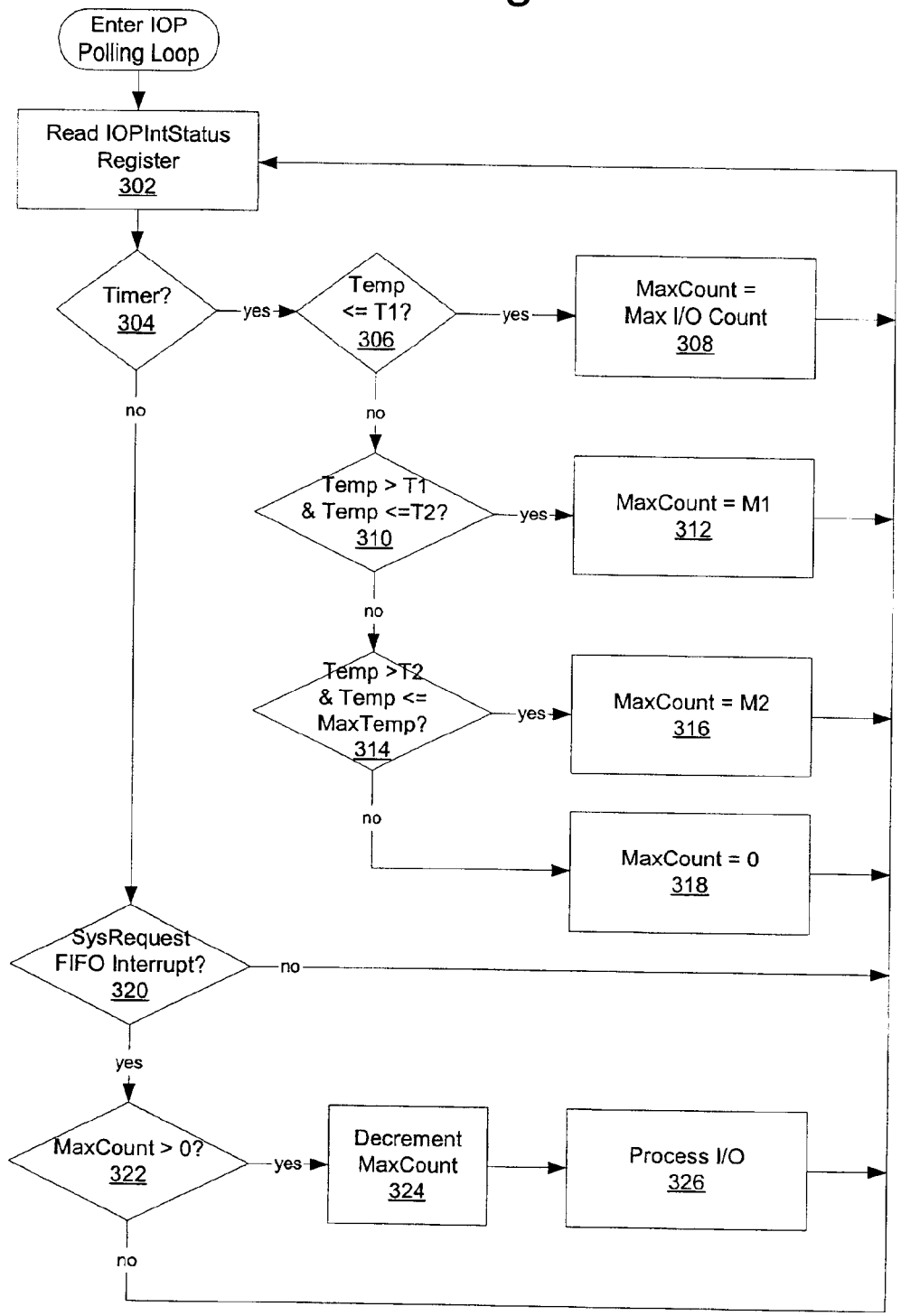
FIG. 3 is a flowchart illustrating the operation of an IO processor in accordance with a preferred embodiment of the present invention.

With reference now to FIG. 3, a flowchart is shown illustrating the operation of an IO processor in accordance with a preferred embodiment of the present invention. The process begins by entering an IOP polling loop and reads the interrupt status register (IOPIntStatus register) (step 302). A determination is made as to whether a timer interrupt is received (step 304). If a timer interrupt is received, a determination is made as to whether the temperature is less than or equal a first threshold, T1 (step 306). If the temperature is less than or equal to T1, the process sets a MaxCount variable to be equal to a predetermined maximum I/O count for the controller (step 308). The first threshold, T1, is a low temperature under which the controller may safely process a maximum number of IO requests. The maximum I/O count may be set to a very high number that is not likely to be reached. For example, the maximum I/O count may be 100,000 IO requests. However, the number may be higher or lower depending upon the implementation. Thereafter, the process returns to step 302 to read the IOPIntStatus register.

If the temperature is not less than or equal to T1 in step 306, a determination is made as to whether the temperature is greater than T1 and less than or equal to a second threshold, T2 (step 310). If the temperature is greater than T1 and less than or equal to T2, the process sets MaxCount to a predetermined number, M1 (step 312). The second threshold, T2, is greater than T1, but low enough such that the controller may safely process M1 IO requests. The number M1 is set to a reasonably high number of IO requests that is less than the maximum I/O count. Thereafter, the process returns to step 302 to read the IOPIntStatus register.

If the temperature is not less than or equal to T2 in step 310, a determination is made as to whether the temperature is greater than T2 and less than or equal to a third threshold, MaxTemp (step 314). If the temperature is greater than T2 and less than or equal to MaxTemp, the process sets Max-Count to a predetermined number, M2 (step 316). The third threshold, MaxTemp, is the highest temperature under which the controller may safely process IO requests. The number M2 is set to a number of IO requests that is less than M1. Thus, the controller may consume less power and the temperature may decrease. Thereafter, the process returns to step 302 to read the IOPIntStatus register.

If the temperature is not less than or equal to MaxTemp in step 314, the process sets MaxCount to zero (step 318). MaxCount determines the number of IO requests the controller may process until the next timer interrupt. Thus, if the temperature is less than the first threshold, the controller processes the maximum I/O count allowed. However, if the temperature is between the first threshold and a second threshold, the controller may processes up to M1 number of IO requests. Similarly, if the temperature is between the second threshold and MaxTemp, the controller may process up to M2 IO requests. Finally, if the temperature is greater than MaxTemp, the controller may not process any IO requests until the next timer interrupt.

Returning to step 304, if a timer interrupt is not received, a determination is made as to whether a SysRequest FIFO Interrupt is received (step 320). If a SysRequest FIFO Interrupt is not received, meaning there are no IO requests in the queue, then the process returns to step 302 to read the IOPIntStatus register. However, if there are IO requests in the queue in step 320, a determination is made as to whether MaxCount is greater than zero (step 322). If MaxCount is greater than zero, the process decrements MaxCount (step 324), processes an IO request (step 326), and returns to step 302 to read the IOPIntStatus register. If MaxCount is not greater than zero in step 322, then the process returns to step 302 to read the IOPIntStatus register. In other words, if MaxCount reaches zero, then the controller has processed the set number of IO requests for the time period and must wait until the next timer interrupt to reset MaxCount.

The process illustrated in FIG. 3 is exemplary and may be modified depending on the implementation. For example, more or fewer thresholds may be included. Furthermore, the IOP may monitor the number of IO requests processed during each time period and compare that number to Max-Count. The process may be simplified greatly simply by including only one threshold, thus allowing the controller to process IO requests only if the temperature is less than or equal to a predetermined threshold. The IOP may also monitor the temperature and slow down processor speeds for the CTX processors and the IOP itself based on the temperature. Furthermore, the IOP may monitor IO requests assigned to CTX processors and balance loads on the CTX processors. For example, if a CTX processor is assigned an IO request with a large amount of data, the IOP may delay assigning IO requests to that processor for a period of time to prevent excess heat output by the CTX and the associated driver.

Thus, the present invention solves the disadvantages of the prior art by monitoring the temperature and controlling the rate of the IO flow to control the temperature. The present invention provides an inexpensive mechanism for controlling power consumption and heat dissipation, thus increasing the reliability of the controller and the server in general. The present invention also modifies existing firmware on controllers. Therefore, other than the inclusion of a temperature sensor, no hardware modifications are required. A server designer may also have the option of reducing the size of the heat sync required and the airflow needed in the server, thus reducing the cost

What is claimed is:

1. A method of managing power in a storage controller, comprising:
   measuring a temperature in a storage controller;
   comparing the temperature to a first threshold; and
   decreasing the throughout of the storage controller by setting a limit to a number of input/output requests to be processed in a given time period if the temperature exceeds the first threshold.

2. A method of managing power in a storage controller, comprising:
   in response to a predetermined event, measuring a temperature in a storage controller, comparing the temperature to at least a first temperature range, and setting an input/output request limit to a first predetermined value if the temperature is within the first temperature range;
   in response to an input/output request, determining whether the input/output request limit has been reached, and processing the input/output request if the input/output request limit not been reached.

3. The method of claim 2, wherein the first temperature range is below a first threshold and the first predetermined value is a predetermined maximum value.

4. The method of claim 2, wherein the first temperature range is between a first threshold and a second threshold.

5. The method of claim 4, further comprising:
   in response to the predetermined event, comparing the temperature to a second temperature range if the temperature is not within the first temperature range, and setting the input/output request limit to a second predetermined value if the temperature is within the second temperature range.

6. The method of claim 5, wherein the second predetermined value is less than the first predetermined value.

7. The method of claim 6, wherein the second predetermined value is zero.

8. The method of claim 2 wherein the first predetermined value is zero.

9. The method of claim 2, further comprising:
   in response to the input/output, decrementing the input/output request limit if the input/output request limit has not been reached.

10. The method of claim 2, wherein the storage controller is an embedded input/output controller.

11. The method of claim 10, wherein the method is performed by a control processor.

12. The method of claim 11, wherein the step of processing the input/output request comprises assigning the input/output request to a lower level processor.

13. The method of claim 2 wherein the predetermined event is a timer interrupt.

14. A storage controller, comprising:
   a temperature sensor; and
   a control processor, coupled to the temperature sensor, wherein the control processor, in response to a predetermined event, measures a temperature using the temperature sensor, compares the temperature to at least a first temperature range, and sets an input/output request limit to a first predetermined value if the temperature is within the first temperature range; and wherein the control processor, in response to an input/output request, determines whether the input/output request limit has been reached, and processes the input/output request if the input/output request limit has not been reached.

15. The storage controller of claim 14 wherein the first temperature range is below a first threshold and the first predetermined value is a predetermined maximum value.

16. The storage controller of claim 14, wherein the first temperature range is between a first threshold and a second threshold.

17. The storage controller of claim 16, wherein the control processor, in response to the predetermined event, compares the temperature to a second temperature range if the temperature is not within the first temperature range, and sets the input/output request limit to a second predetermined value if the temperature is within the second temperature range.

18. The storage controller of claim 17, wherein the second predetermined value is less than the first predetermined value.

19. The storage controller of claim 18, wherein the second predetermined value is zero.

20. The storage controller of claim 14, wherein the first predetermined value is zero.

21. The storage controller of claim 14, wherein the controller processor, in response to the input/output request, decrements the input/output request limit if the input/output request limit has not been reached.

22. The storage controller of claim 14, wherein the storage controller is an embedded input/output controller.

23. The storage controller of claim 22, wherein the control processor assigns the input/output request to a lower level processor.

24. The storage controller of claim 14, wherein the predetermined event is a timer interrupt.

25. A computer program product, in a computer readable medium, for managing power in a storage controller, comprising;

instructions, in response to a predetermined event, for measuring a temperature in a storage controller, comparing the temperature to at least a first temperature range, and setting an input/output request limit to a first predetermined value if the temperature is within the first temperature range;

instructions, in response to an input/output request, for determining whether the input/output request limit has been reached, and processing the input/output request if the input/output request limit has not been reached.

* * * * *